3,565,630
SUPERSENSITIZATION WITH CYANINE AND MEROCYANINE DYES
Allan G. Millikan, Webster, and Gary L. Hiller, Rochester, N.Y., assignors to Eastman Kodak Company, Rochester, N.Y., a corporation of New Jersey
No Drawing. Filed Oct. 5, 1967, Ser. No. 672,991
Int. Cl. G03c 1/10, 1/22
U.S. Cl. 96—120                         34 Claims

ABSTRACT OF THE DISCLOSURE

Fine grain photographic silver halide emulsions are spectrally sensitized with the combination of a quaternated, complex cyanine dye and a complex merocyanine dye.

---

This invention relates to novel combinations of cyanine dyes for sensitizing photographic silver halide emulsions comprising (1) certain quaternated trinuclear complex cyanine dyes and (2) certain trinuclear complex merocyanine dyes, and more particularly to novel silver halide emulsions containing these novel sensitizing dye combinations, and to photographic elements prepared therewith.

It is well known in the art of making photographic silver halide emulsions that certain cyanine dyes in combination extend the sensitivity of photographic silver halide emulsions in greater degree than do the individual dyes in such emulsions. This effect has often been referred to in the prior art as a kind of supersensitization. Such proposed combinations have been found useful in a number of photographic applications. However, none have proven entirely satisfactory for use in recording the spectrum continuously over the region of about 300 to 700 nm., especially in the field of microimagery where fine detail is a strict requirement. Also, the speed at longer wavelength radiations has fallen short of desirable levels in many recording applications. There is need, therefore, for new and improved photographic materials capable of fine detail recording with a single element in the above mentioned region of the spectrum.

It is, accordingly, an object of this invention to provide novel supersensitizing combinations of certain quaternated trinuclear complex cyanine dyes with certain trinuclear complex merocyanine dyes for sensitizing photographic silver halide emulsions, essentially continuously, over the region of the spectrum, ranging from about 300 to 750 nm. Another object of this invention is to provide novel and improved photographic silver halide emulsions containing such supersensitizing dye combinations that are capable of accurate recording of fine detail over the above mentioned spectral sensitivity range. Another object is to provide photographic elements having at least one layer comprising a novel emulsion of the invention. Other objects of this invention will be apparent from this disclosure and the appended claims.

We have now made the remarkable discovery that new and highly advantageous supersensitizing dye combinations comprising (1) certain quaternated trinuclear complex cyanine and (2) trinuclear complex merocyanine dyes are particularly useful for extending the sensitivity range of fine grain photographic silver halide emulsions, thus making these emulsions useful for recording a variety of wavelength exposures, especially narrow band exposures, over the region of the spectrum ranging about from 300 to 750 nm. These dye combinations, we have further discovered, also increase the inherent blue speed of the emulsion, thus increasing the overall speed over a wider spectral range. Notable increases in the relative speeds in recording in the green to red region of the spectrum are also provided by our unique dye combinations. These results are indeed surprising because the dyes when used individually have a desensitizing effect on the inherent blue speed of conventional emulsions, i.e., emulsions having an average silver halide grain size greater than about 0.5 micron. Furthermore, the novel dye combinations of the invention give homogeneous and smooth flowing fine grain emulsions having excellent keeping stability, and causing little, if any, fogging in both the fresh and incubated emulsions. Accordingly, this invention provides unitary photographic elements well suited for recording the radiations in the above specified range in fine detail. The proportions of the dyes employed in the dye combinations of the invention can vary over practically any limits; however, the most efficacious combinations are those containing the respective complex dyes in the proportions of about from 10 to 90% by weight of dye (1) and conversely about from 90 to 10% by weight of dye (2). As used herein and in the appended claims, the term "fine grain" refers to silver halide emulsions wherein the silver halide grains have an average grain size of less than about .5 micron, and preferably about from .04 to .40 micron.

From the foregoing description, it will be apparent that the principal advantages of this invention, as compared with prior art proposals, may be summarized as follows:

(1) Increased inherent blue speed of fine grain emulsions;
(2) Increased spectral range for recording fine detail;
(3) Increased speed over the wide spectral range; and
(4) Only one plate necessary to record a variety of wavelength exposures, especially narrow band exposures.

The novel dye combinations of the invention comprise (1) a quaternated complex cyanine dye having three 5- to 6-membered nitrogen containing heterocyclic nuclei joined at carbon atoms thereof by methine linkage, the terminal nuclei being basic heterocyclic nuclei of the type used in cyanine dyes, and the central nucleus being an acidic keto heterocyclic nucleus of the type used in merocyanine dyes, said dye having the amidinium ion system; and (2) a complex merocyanine dye having three 5- to 6-membered nitrogen hereterocyclic nuclei joined at carbon atoms thereof by a double bond or a methine (preferably dimethine) linkage, one terminal nucleus being a basic heterocyclic nucleus of the type used in cyanine dyes, and the other two nuclei being acidic keto heterocyclic nuclei of the type used in merocyanine dyes, said dye having the amidic system. For definitions of the amidinium ion and amidic systems reference can be had the "The Theory of the Photographic Process" by Mees and James, third edition, p. 201 (1966), The MacMillan Company, New York.

The preferred quaternated trinuclear complex cyanine dye compounds (1) of the invention include those represented by the following general formula:

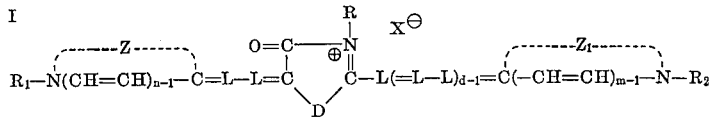

wherein $n$, $m$ and $d$ each represents a positive integer of from 1 to 2; L represents a methine linkage, e.g., =CH—, =C(CH$_3$)—, =C(C$_6$H$_5$)—, etc.; D represents an atom of oxygen, sulfur, selenium or the group =N—R wherein R represents an alkyl group (preferably a lower alkyl containing from 1 to 4 carbon atoms), e.g., methyl, ethyl, propyl, isopropyl, butyl, decyl, dodecyl, etc., a cycloalkyl group, e.g., cyclopentyl, cyclohexyl, etc., or an aryl group, e.g., phenyl, tolyl, naphthyl, methoxyphenyl, chlorophenyl, etc.; $R_1$ and $R_2$ each represents an alkyl group, including substituted alkyl (preferably a lower alkyl containing from 1 to 4 carbon atoms), e.g., methyl, ethyl, propyl, isopropyl, butyl, hexyl, cyclohexyl, decyl, dodecyl, etc., and substituted alkyl groups (preferably a substituted lower alkyl containing from 1 to 4 carbon atoms), such as a hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group, e.g., β-carboxyethyl, ω-carboxybutyl, etc.; a sulfoalkyl group, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxybutyl, etc., an alkoxycarbonylalkyl group, e.g., β-methoxycarbonylethyl, ω-ethoxycarbonylbutyl, etc., or an aralkyl group, e.g., benzyl, phenethyl, etc., or an alkenyl group, e.g., allyl, 1-propenyl, 2-butenyl, etc., or, any aryl group, e.g., phenyl, tolyl, naphthyl, methoxyphenyl, chlorophenyl, etc.; X represents an acid anion, e.g., chloride, bromide, iodide, perchlorate, sulfamate, p-toluenesulfonate, methyl sulfate, etc.; and Z and $Z_1$ each represents the nonmetallic atoms necessary to complete the same or different 5- to 6-membered heterocyclic nucleus, which nucleus may contain a second hetero atom such as oxygen, sulfur, selenium or nitrogen, such as the following nuclei:

a thiazole nucleus, e.g., thiazole,
4-methylthiazole,
4-phenylthiazole,
5-methylthiazole,
5-phenylthiazole,
4,5-dimethylthiazole,
4,5-diphenylthiazole,
4-(2-thienyl)thiazole,
benzothiazole,
4-chlorobenzothiazole,
5-chlorobenzothiazole,
6-chlorobenzothiazole,
7-chlorobenzothiazole,
4-methylbenzothiazole,
5-methylbenzothiazole,
6-methylbenzothiazole,
5-bromobenzothiazole,
6-bromobenzothiazole,
5-phenylbenzothiazole,
5-phenylbenzothiazole,
4-methoxybenzothiazole,
5-methoxybenzothiazole,
6-methoxybenzothiazole,
5-iodobenzothiazole,
6-iodobenzothiazole,
4-ethoxybenzothiazole,
5-ethoxybenzothiazole,
tetrahydrobenzothiazole,
5,6-dimethoxybenzothiazole,
5,6-dioxymethylenebenzothiazole,
5-hydroxybenzothiazole,
6-hydroxybenzothiazole,
naphtho[2,1-d]thiazole,
naphtho[1,2-d]thiazole,
5-methoxynaphtho[2,3-d]thiazole,
5-ethoxynaphtho[2,3-d]thiazole,
8-methoxynaphtho[2,3-d]thiazole,
7-methoxynaphtho[2,3-d]thiazole,
4'-methoxythianaphtheno-7',6',4,5-thiazole, etc.;

an oxazole nucleus, e.g., 4-methyloxazole,
5-methyloxazole,
4-phenyloxazole,
4,5-diphenyloxazole,
4-ethyloxazole,
4,5-dimethyloxazole,
5-phenyloxazole,
benzoxazole,
5-chlorobenzoxazole,
5-methylbenzoxazole,
5-phenylbenzoxazole,
6-methylbenzoxazole,
5,6-dimethylbenzoxazole,
4,6-dimethylbenzoxazole,
5-methoxybenzoxazole,
5-ethoxybenzoxazole,
5-chlorobenzoxazole,
6-methoxybenzoxazole,
5-hydroxybenzoxazole,
6-hydroxybenzoxazole,
naphtho[2,1-d]oxazole,
naphtho[1,2-d]oxazole, etc.;

a selenazole nucleus, e.g., 4-methylselenazole,
4-phenylselenazole,
benzoselenazole,
5-chlorobenzoselenazole,
5-methoxybenzoselenazole,
5-hydroxybenzoselenazole,
tetrahydrobenzoselenazole,
naphtho[2,1-d]selenazole,
naphtho[1,2-d]selenazole, etc.;

a thiazoline nucleus, e.g., thiazoline, 4-methylthiazoline, etc.; a pyridine nucleus, e.g., 2-pyridine, 5-methyl-2-pyridine, 4-pyridine, 3-methyl-4-pyridine, etc.;

a quinoline nucleus, e.g., 2-quinoline,
3-methyl-2-quinoline,
5-ethyl-2-quinoline,
6-chloro-2-quinoline,
8-chloro-2-quinoline,
6-methoxy-2-quinoline,
8-ethoxy-2-quinoline,
8-hydroxy-2-quinoline,
4-quinoline,
6-methoxy-4-quinoline,
7-methyl-4-quinoline,
8-chloro-4-quinoline,
1-isoquinoline,
3,4-dihydro-1-isoquinoline,
3-isoquinoline, etc.;

a 3,3-dialkylindolenine nucleus, e.g., 3,3-dimethylindolenine,
3,3,5-trimethylindolenine, etc.; and, an imidazole nucleus, e.g., imidazole,
1-alkylimidazole,
1-alkyl-4-phenylimidazole,
1-alkyl-4,5-dimethylimidazole,
benzimidazole,
1-alkylbenzimidazole,
1-aryl-5,6-dichlorobenzimidazole,
1-alkyl-1H-naphth[1,2-d]imidazole,
1-aryl-3H-naphth[1,2-d]imidazole,
1-alkyl-5-methoxy-1H-naphth[1,2-d]imidazole, and the like nuclei. Dyes of Formula I above wherein Z and $Z_1$ each represents the atoms necessary to complete a thiazole nucleus and D represents the group =N—R wherein R is as previously defined provide especially efficacious dye combinations of the invention.

The preferred trinuclear complex merocyanine dye compounds (2) of the invention include those represented by the following general formula:

(II)

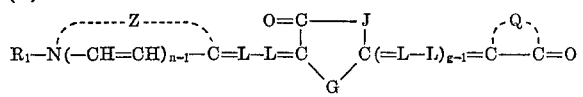

wherein $n$, L, $R_1$ and Z are as previously defined; $g$ represents a positive integer of from 1 to 2; G and J each represents an atom of oxygen, sulfur, selenium or the group =N—R, wherein R is as previously defined, such that at least one of G and J represents the =N—R group; and Q represents the non-metallic atoms necessary to complete a 5- or 6-membered nucleus, typically containing a hetero atom selected from nitrogen, sulfur, selenium, and oxygen, such as a 2-pyrazolin-5-one nuclues, e.g., 3-methyl-1-phenyl-2-pyrazolin-5-one, 1-phenyl-2-pyrazolin-5-one, 1-(2-benzothiazolyl)-3-methyl-2-pyrazolin-5 - one, 1-(2-benzothiabolyl)-3-methyl-2-pyrazolin-5-one, etc.; an isoxazolone nucleus, e.g., 3-phenyl-5(4H)-isoxazolone, 3-methyl-5(4H)-isoxazolone, etc.; an oxindole nucleus, e.g., 1-alkyl-2-oxindoles, etc.; a 2,4,6-triketohexahydropyrimidine nucleus, e.g., barbituric acid or 2-thiobarbituric acid as well as their 1-alkyl (e.g., 1-methyl, 1-ethyl, 1-propyl, 1-heptyl, etc.) or 1,3-dialkyl (e.g., 1,3-dimethyl, 1,3-diethyl, 1,3-dipropyl, 1,3-diisopropyl, 1,3-dicyclohexyl, 1,3-di(β-methoxyethyl), etc.; or 1,3-diaryl (e.g., 1,3-diphenyl, 1,3-di-(p-chlorphenyl), 1,3 - di(p-ethoxycarbonylphenyl), etc.); or 1-aryl (e.g., 1-phenyl, 1-p-chlorophenyl, 1-p-ethoxycarbonylphenyl, etc.) or 1 - alkyl-3-aryl (e.g., 1-ethyl-3-phenyl, 1-n-heptyl-3-phenyl, etc.) derivatives; a rhodanine nucleus (i.e., 2-thio-2,4-thiazolidinedione series), such as rhodanine, 3-alkylrhodanines, e.g., 3-ethylrhodanine, 3-allylrhodanine, etc., 3-carboxyalkylrhodanines, e.g., 3-(2-carboxyethyl)rhodanine, 3-(4-carboxybutyl)rhodanine, etc., 3-sulfoalkylrhodanines, e.g., 3-(2-sulfoethyl)rhodanine, 3-(3-sulfopropyl)rhodanine, 3-(4-sulfobutylrhodanine, etc., or 3 - arylrhodanines, e.g., 3-phenylrhodanine, etc., etc.; a 2(3H) - imidazo[1,2 - a]pyridone nucleus; a 5,7-dioxo-6,7-dihydro-5-thiazolo[3,2-a]pyrimidine nucleus, e.g., 5,7-dioxo-3-phenyl-6,7-dihydro - 5 - thiazolo[3,2-a]pyrimidine, etc.; a 2-thio-2,4-oxazolidinedione nucleus (i.e., those of the 2-thio-2,4-(3H, 5H)-oxazoledione series) e.g., 3-ethyl-2-thio-2,4-oxazolidinedione, 3-(2-sulfoethyl)-2-thio-2,4 - oxazolidinedione, 3-(4-sulfobutyl)-2-thio-2,4-oxazolidinedione, 3 - (3-carboxypropyl-2-thio-2,4-oxazolidinedione, etc.; a thianaphthenone nucleus, e.g., 3-(2H)-thianaphthenone, etc.; a 2-thio-2,5-thiazolidinedione nucleus (i.e., the 2-thio-2,5-(3H,4H)-thiazoledione series), e.g., 3-ethyl-2-thio-2,5-thiazolidinedione, etc.; a 2,4-thiazolidinedione nucleus, e.g., 2,4-thiazolidinedione, 3-ethyl-2,4-thiazolidinedione, 3-phenyl-2,4-thiazolidinedione, 3-α-naphthyl-2,4-thiazolidinedione, etc.; a thiazolidinone nucleus, e.g., 4-thiazolidinone, 3 - ethyl - 4 - thiazolidinone, 3 - phenyl - 4 - thiazolidinone, 3-α-naphthyl-4-thiazolidinone, etc.; a 2-thiazolin-4-one nucleus, e.g., 2-ethylmercapto-2-thiazolin-4-one, 2-alkylphenylamino-2-thiazolin-4-one, 2 - diphenylamino - 2-thiazolin-4-one, etc.; a 2-imino-4-oxazolidinone (i.e., pseudohydantoin) nucleus; a 2,4-imidazolidinedione (hydantoin) nucleus, e.g., 2,4 - imidazolidinedione, 3-ethyl-2,4-imidazolidinedione, 3-phenyl-2,4-imidazolidinedione, 3-α-naphthyl-2,4-imidazolidinedione, 1,3-diethyl-2,4-imidazolidinedione, 1-ethyl-3-phenyl-2,4-imidazolidinedione, 1-ethyl-3-α-naphthyl-2,4-imidazolidinedione, 1,3-diphenyl-2,4-imidazolidinedione, etc.; a 2-thio-2,4-imidazolidinedione (i.e., 2-thiohydantoin) nucleus, e.g., 2-thio-2,4-imidazolidinedione, 3-ethyl-2-thio-2,4-imidazolidinedione, 3-(4-sulfobutyl)-2-thio-2,4-imidazolidinedione, 3-(2-carboxyethyl)-2-thio-2,4-imidazolidinedione, 3-phenyl-2-thio-2,4-imidazolidinedione, 3-α - naphthyl-2-thio-2,4-imidazolidinedione, 1,3-diethyl-2-thio-2,4 - imidazolidinedione, 1-ethyl-3-phenyl-2-thio-2,4-imidazolidinedione, 1-ethyl - 3-α-naphthyl-2-thio-2,4-imidazolidinedione, 1,3-diphenyl-2-thio-2,4-imidazolidinedione, etc.; a 2 - imidazolin-5-one nucleus, e.g., 2-propylmercapto-2-imidazolin-5-one, etc.; etc. (especially useful are nuclei wherein Q represents a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom). The nuclei wherein Z in above Formula II represents the atoms necessary to complete a 1,3,3-trialkylindolenine nucleus provide especially useful dye combinations of the invention.

Included among the complex cyanine dyes defined by Formula I above are the following typical dye compounds.

| Dye No. | Compound |
|---|---|
| A | 3-ethyl-5-[(3-methyl-2-thiazolidinylidene)ethylidene]-2-[3-methyl-2-thiazolidinylidene)-1-propenyl]-4-oxo-1-phenyl-2-imidazolinium iodide. |

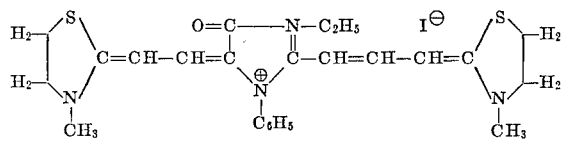

| B | 2-[2-benzothiazolyl etho-p-toluenesulfonate)methylene]-5-[(1,3-diethyl-2-(3H)-benzimidazolylidene)ethylidene]-3-ethyl-4-thiazolidone. |

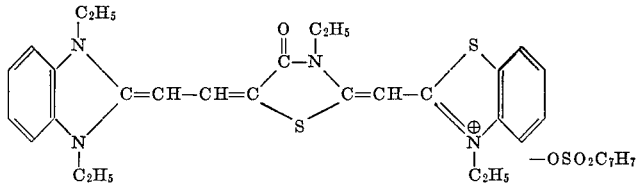

| C | 1-Ethyl-4-[(3-ethyl-2(3H)-benzoxazolylidene)ethylidene]-2-[(3-ethyl-2(3H)-benzoxazolylidene)-1-propenyl]-5-oxo-3-phenyl-2-imidazolinium iodide. |

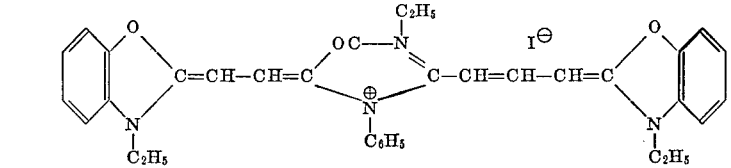

The complex cyanine dyes such as Dyes A, B, and C above and related dyes have, in general, been previously described in the prior art. Among the references describing the preparation of such dyes are J. Brunken and S. Zeh, German Pat. No. 9740, dated May 2, 1955; R. H. Sprague U.S. Pat. No. 2,263,018, dated Nov. 30, 1941; L. G. S. Brooker U.S. Pat. No. 2,454,629, dated Nov 23, 1948; and J. E. Jones U.S. Pat. No. 2,947,630, dated Aug. 2, 1960. For example, dyes such as Dyes A and C can be conveniently prepared as described in above Brunken and Zeh patent by condensing a compound of the formula:

(III)

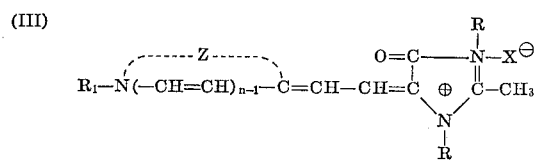

with a compound of the formula:

(IV)

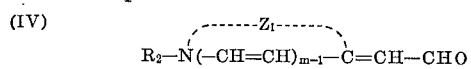

wherein $n$, $m$, $R_1$, $R_2$, X, Z and $Z_1$, in Formulas III and IV are as previously defined.

It will be apparent that by appropriate selection of intermediates defined by Formulas III and IV above that other complex cyanine dyes of Formula I above can be readily prepared having generally similar properties individually, and in combination with the complex merocyanine dyes of Formula II above. Typical other such dyes include, for example, the dye 3-ethyl-5-[(3-methyl-2 - benzothiazolidinylidene)ethylidene] - 2 - [(3-methyl-2 - benzothiazolidinylidene) - 1 - propenyl]-4-oxo-1-phenyl - 2 - imidazolium salt, e.g., the chloride, bromide, iodide, perchloroate, p-toluenesulfonate, etc. salts, the dye 3 - ethyl - 5 - [3-methyl-2-benzoselenazolidinylidene)ethylidene] - 2 - [(3 - methyl-2-benzoselenazolidinylidene)-1 - propenyl] - 4 - oxo-1-phenyl-2-imidazolium salt, e.g., the chloride, bromide, iodide, perchlorate, p-toluenesulfonate, etc. salts, the dye 2 - [(2 - benzothiazolyletho-p-toluenesulfonate)methylene] - 5 - [(1,3 - diethyl-2(3H)-benzoxalzolylidene)ethylidene] - 3 - ethyl - 4-thiazolidine (or other salts such as the ethoiodide, the ethoperchlorate, etc.), the dye 2 - [3-(3-ethyl-2(3H)-benzothiazolylidene) propenyl] - 5 - [(3-ethyl-2-(3H)-benzoxazolylidene)ethylidene] - 4(5H) - thiazolone ethiodide (or other salts such as the etho-p-toluenesulfonate, the ethoiodide, the ethoperchlorate, etc.), and the like dyes.

Included among the complex merocyanine dyes defined by Formula II above are the following typical dye compounds.

| Dye No. | Compound |
|---|---|
| I | 2-[(2-diphenylamino-4-oxo-2-thiazolin-5-ylidene)ethylidene]-3-ethyl-1-phenyl-5-[(1,3,3-trimethyl-2-indolinylidene)ethylidene]-4-imidazolidinone. |
| II | 2-[(1-carboxymethyl-4-oxo-3-phenyl-2-thioxo-5-imidazolidenylidene) ethylidene]-3-ethyl-1-phenyl-5-[(1,3,3-trimethyl-2-indolinylidene) ethylidene]-4-imidazolidinone. |
| III | 2-[(2-benzothiazolyl)-3-methyl-5-oxo-2-pyrazolin-4-ylidene]ethylidene]-3-ethyl-5-}(3-ethyl-2-benzoxazolinylidene)ethlidene]-1-phenyl-4-imidazolidinone. |
| IV | 1,3-diethyl-5-[(3-ethyl-2-benzoxazolinylidene)ethylidene]-2-[(1-ethylhexahydro-4,6-dioxo-2-thioxo-5-pyrimidinylidene)ethylidene]-4-imidazolidinone. |
| V | 1,3-diethyl-5-[(3-ethyl-2-benzoxazolinylidene)ethylidene]-2-[(3-methyl-5-oxo-1-phenyl-2-pyrazolin-4-ylidene)ethylidene]-4-imidazolidinone. |

| Dye No. | Compound |
|---|---|
| VI | 3-ethyl-5-[(3-ethyl-2-benzothiazolinylidene)ethylidene]-2-[(3-methyl-5-oxo-1-phenyl-2-pyrazolin-4-ylidene)ethlidene]-1-phenyl-4-imidazolidinone. |

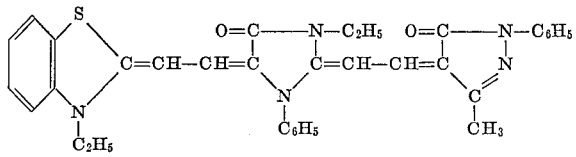

| | |
|---|---|
| VII | 3-ethyl-5-[(3-ethyl-2-benzothiazolinylidene)isopropylidene]-2-[(3-ethyl-4-oxo-2-thioxo-5-thiazolidinylidene)ethylidene]-1-phenyl-4-imidazolidinone. |

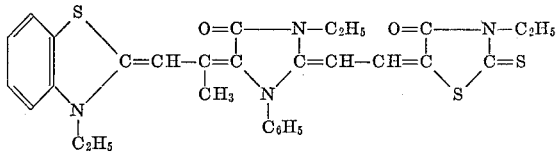

| | |
|---|---|
| VIII | 2-[(3-methyl-5-oxo-1-phenyl-2-pyrazolin-4-ylidene)ethylidene]-1-phenyl-5-[(1,3,3-trimethyl-2-indolinylidene)ethylidene]-4-imidazolidinone. |

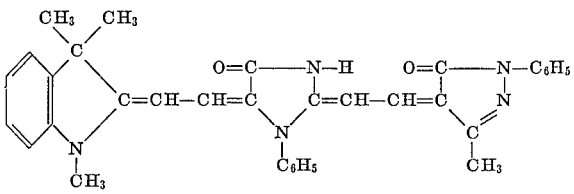

| | |
|---|---|
| IX | 3-(3-diethylaminopropyl)-2-[3-dimethylaminopropyl)-4-oxo-2-thioxo-5-thiazolidinylidene]-5-[(1-ethylnaphtho[1,2-d]thiazolin-2-ylidene)-1-phenylethylidene]-4-thiazolidinone. |

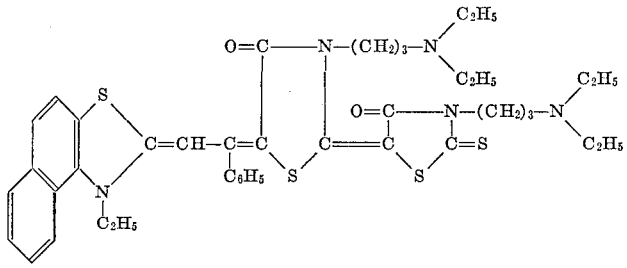

| | |
|---|---|
| X | 2-(1,3-diethylhexahydro-4,6-dioxo-2-thioxo-5-pyrimidinylidene)-3-ethyl-5-[(3-ethyl-2-benzothiazolinylidene)-1-phenylethylidene]-4-thiazolidinone. |

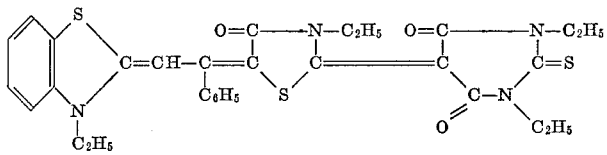

The above Dyes I to VIII and related dyes can be readily prepared by the general process described in copending application of Jenkins Ser. No. 657,082, filed July 31, 1967, entitled "Trinuclear Complex Merocyanine Dyes," for example, by condensing a compound of the formula:

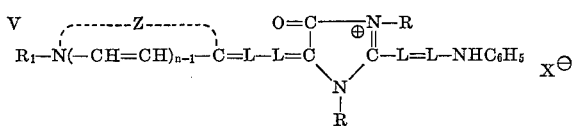

with a compound of the formula:

wherein $n$, L, R, $R_1$, Q and Z in Formulas V and VI are as previously defined, dissolved in a suitable solvent, in the presence of a basic condensing agent such as triethylamine. The preparations of a number of these dyes are described in Examples A, B, C and D hereinafter.

The above Dyes IX and X have, in general, been previously described in the prior art and are prepared, for example, by the general method set forth in Aubert et al. U.S. Pat. No. 2,656,351, dated Oct. 20, 1953.

According to the invention, one of more of the complex cyanine dyes represented by Formula I above are incorporated with one or more of the complex merocyanine dyes represented by Formula II above. The invention is particularly directed to fine grain gelatino-silver-halide developing-out emulsions. However, the supersensitizing combinations can also be employed in silver halide emulsions in which the carrier or vehicle is a hydrophilic colloid other than gelatin, such as, for example, albumin, agar-agar, gum arabic, alginic acid, etc., or a hydrophilic resin such as polyvinyl alcohol, polyvinyl pyrrolidone, a cellulose ether, a partially hydrolyzed cellulose acetate, acrylamide polymers, etc., which has no deleterious effect upon the light-sensitive silver halide.

The dyes of Formula I and Formula II can be employed in the combinations of the invention in various concentrations depending upon the particular emulsion, concentration of the silver halide, particular results desired, etc. The optimum concentration of an individual sensitizing dye can be determined in a manner well known to those skilled in the art by measuring the sensitivity of a series of test portions of the same emulsion, each portion containing a different concentration of the sensitizing dye. As previously mentioned, the preferred combinations range about from 10 to 90% of the complex cyanine dye and conversely about from 90 to 10% of the complex merocyanine dye. The optimum concentration of the supersensitizing combination can, of course, be readily determined in the same manner, by measuring the sensitivity of a series of test portions of the same emulsion, each portion containing different concentrations of the individual dyes in the combination. In determining the optimum concentration for the supersensitizing combination, it is advantageous to employ, at first, concentrations of the individual dyes less than their optimum concentrations. The concentrations of the individual dyes can then be increased until the optimum concentration of the supersensitizing combination is determined.

The methods of incorporating sensitizing dyes in silver halide emulsions are well known to those skilled in the art and these known techniques are employed in dispersing the dyes of the invention in the emulsions. These sensitizing dyes can be directly dispersed in the emulsions, or they can first be dissolved in some convenient solvent, such as pyridine, methyl alcohol, acetone, etc. (or mixtures of such solvents), or diluted with water in some instances, and added to the emulsions in the form of these solutions. If desired, the dyes can be separately dissolved in a given solvent and added separately to the emulsion, or they can be dissolved in the same or different solvent and these solutions mixed together before addition is made to the silver halide emulsions. The dyes of the invention can be dispersed in the finished emulsions and should be uniformly distributed throughout the emulsions before the emulsions are coated on a suitable support, such as paper, glass, cellulose ester film, polyvinyl resin film (e.g., polystyrene film, polyvinyl chloride film, etc.), polyester film, etc. The following procedure has been found quite satisfactory: Stock solutions of the dyes of Formulas I and II above are prepared by separately dissolving these dyes in appropriate solvents as described above. Then, to the flowable silver halide emulsion, the desired amount of stock solution of one of the dyes is slowly added while stirring the emulsion. Stirring is continued until the dye is thoroughly incorporated in the emulsion. Then, the desired amount of stock solution of the other dye is slowly added to the emulsion while stirring. Stirring is continued until the second dye is thoroughly incorporated in the emulsion. The supersensitized emulsions can then be coated on a suitable support and the coating allowed to dry. In some instances, it may be desirable to heat the supersensitized emulsion for a few minutes before coating onto the suitable support. The details of such coating techniques are well known to those skilled in the art. The foregoing procedure and proportions are to be regarded only as illustrative. Clearly, the invention is directed to any fine grain silver halide emulsion containing a combination of the aforesaid dyes whereby a supersensitizing effect is obtained, e.g., gelatino silverchloride, -chlorobromide, -chloroiodide, chlorobromoiodide, bromoiodide, etc., emulsions.

The fine grain emulsions employed herein may be prepared by precipitating photosensitive silver halide crystals, in an aqueous medium, in the presence of an acid substituted aryl mercaptan, e.g., thiosalicylic acid, dissolved in said medium. Gelatin or other suitable hydrophilic colloid is added and the emulsion obtained is chilled and set. The chilled emulsion is then shredded into small noodles and washed in running tap water. After washing, the emulsion is remelted, and the volume, pH and Pag are adjusted. A fine grain gelatino-silver bromoiodide emulsion prepared in the above manner and containing a dye combination of the invention is particularly useful for recording radiations in the region of the spectrum ranging about from 300 to 750 nm. in fine detail. Further details for preparing such fine grain emulsions can be had by reference to copending application of Sutherns, Ser. No. 622,034, filed Mar. 10, 1967.

The invention is further illustrated by the following examples.

EXAMPLE 1

This example illustrates the desensitizing effect of the individual dyes defined by Formulas I and II on conventional type emulsions when incorporated therein. The dyes are added to a sliver bromoiodide emulsion containing 0.77 mole percent iodide of the type described by Trivelli and Smith, Phot. Journal, 79, 330 (1939), and having an average grain size of 0.9 micron. The individual dyes, dissolved in suitable solvents, are added to separate portions of the emulsion at the concentrations indicated in Table 1 hereinafter. In each case, after being digested at about 50° C. for 10 minutes, the emulsion is coated at a coverage of 432 mg. silver per square foot on a cellulose acetate film support. A sample of each coating is exposed on an Eastman IB Sensitometer through Kodak Wratten Filters 35+38A to determine blue sensitivity and to a wedge spectrograph, processed for three minutes in Kodak Developer D–19 which has the following composition:

| | G. |
|---|---|
| N-methyl-p-aminophenol sulfate | 2.0 |
| Hydroquinone | 8.0 |
| Sodium sulfite (desiccated) | 90.0 |
| Sodium carbonate (monohydrate) | 52.5 |
| Potassium bromide | 5.0 |

Water to make 1.0 liter.

and then fixed in a conventional sodium thiosulfate fixing bath, washed and dried. Densitometric measurements are then made of the developed images of each coating. The relative speed values are calculated based on an arbitrary relative speed of 100 for the control containing no dye. The results are listed in the following table together with the sensitizing ranges and maximum sensitivities.

TABLE 1

| Dye No. | Conc. dye, g./mole silver | Sensitization range (nm.) | Sensiti, zation max. (nm.) | Relative blue speed |
|---|---|---|---|---|
| Control | 0.00 | | | 100 |
| A | 0.06 | To 690 | 640 | 73 |
| B | 0.08 | To 685 | 610 | 53 |
| C | 0.08 | To 765 | 700 | 19 |
| I | 0.06 | To 730 | 680 | 53 |
| III | 0.08 | 680 | 630 | 40 |
| IV | 0.08 | 660 | 620 | 69 |
| V | 0.08 | 670 | 620 | 48 |
| VI | 0.08 | 735 | 660 | 44 |
| VII | 0.08 | 765 | 715 | 10 |
| VIII | 0.08 | 680 | 625 | 63 |
| IX | 0.08 | 730 | 670 | 13 |
| X | 0.08 | 690 | 640 | 36 |

Referring to above Table 1, it will be seen that the relative blue speed for each of the dyes listed is substantially less than that shown for the control containing no dye. This result clearly shows that the dyes employed in this invention actually desensitize conventional silver halide emulsions having an average silver halide grain size above 0.5 micron. When Dye II is substituted for Dye I in Example 1, similar results are obtained.

EXAMPLE 2

This example illustrates that the individual dyes defined by Formulas I and II have a limited sensitization range and peak, and give only a moderate increase in inherent blue speed when used separately in a fine grain emulsion.

Dyes A, I and II are added to separate portions of two different sulfur and gold sensitized silver bromoiodide gelatin emulsions, one emulsion having an average grain size of 0.20μ and the other an average grain size of 0.12μ. A control for each emulsion without the sensitizing dye is also prepared. The emulsions are coated at a coverage of 100 mg. silver per square foot and 398 mg. gelatin per square foot on a cellulose acetate film support. The coatings are exposed as in Example 1 and processed for six minutes in an elon-hydroquinone developer, fixed, washed and dried. Results in Table 2 below show the limited sensitization range and peak of these dyes used alone in a fine grain emulsion, and the increase in inherent blue speed as the grain size decreases.

TABLE 2

| Dye No. | Conc. dye, g./mole silver | Sensitization range (nm.) | Sensitization max. (nm.) | Relative blue speed |
| --- | --- | --- | --- | --- |
| Control | 0.00 |  |  | 100 |
| A | 0.10 | To 700 | 630 | 200 |
| I | 0.05 | To 750 | 670 | 159 |
| II | 0.05 | To 760 | 700 | 126 |
| III | 0.3 | To 700 | 640 | 162 |
| IV | 0.1 | To 680 | 630 | 219 |
| V | 0.4 | To 680 | 630 | 105 |
| VI | 0.1 | To 760 | 665 | 178 |
| VII | 0.2 | To 800 | 700 | 170 |
| VIII | 0.2 | To 680 | 630 | 251 |
| IX | 0.2 | To 730 | 670 | 155 |
| Average grain size=0.12μ | | | | |
| Control | 0.00 |  |  | 100 |
| A | 0.20 | To 700 | 630 | 398 |
| I | 0.10 | To 750 | 670 | 398 |
| II | 0.05 | To 760 | 700 | 251 |
| IX | 0.20 | To 720 | 680 | 200 |
| X | 0.20 | To 690 | 640 | 251 |

EXAMPLE 3

This example illustrates that the combination of dyes defined by Formulas I and II greatly increase inherent blue speed, the spectral sensitization range and the speed at long wavelengths, thus making it possible to record a variety of wavelength exposures with one fine grain photographic plate or element.

An extremely fine grain silver bromoiodide gelatin emulsion is prepared in a manner similar to that described in the copending application of Sutherns, Ser. No. 622,034 filed Mar. 10, 1967, and sulfur and gold sensitized as described therein. The average grain size of the silver halide crystals in this emulsion is of the order of about from 0.075 to 0.080 micron. A number of the dyes individually and in certain combinations are incorporated in separate portions of the above emulsion. Each sample is coated, exposed and processed by the procedure described in above Example 2. A known red sensitizer, Dye Z, which does not conform to the structures of the dyes of this invention, is also included individually for comparison purposes. The sensitization ranges and the relative blue speed and relative speeds at 633 nm. and 694 nm. are measured. The results are recorded in the following table.

TABLE 3

| Dye No. | Conc. dye, g./mole silver | Sensitization range (nm.) | Relative speed Blue | 633 nm. | 694 nm. |
| --- | --- | --- | --- | --- | --- |
| Control | 0.00 |  | 100 |  |  |
| A | 0.30 | To 700 | 15,900 | 100 | 12.5 |
| B | 0.30 | To 685 | 8,130 | 83 | <1 |
| C | 0.10 | To 730 | 9,770 | <1 | 50 |
| III | 0.30 | To 680 | 4,790 | 40 | <1 |
| VII | 0.10 | To 765 | 5,500 | <1 | 32 |
| IX | 0.30 | To 660 | 1,000 | 100 | <1 |
| II plus A | 0.10; 0.30 | To 760 | 12,600 | 100 | 50 |
| I plus A | 0.10; 0.30 | To 730 | 20,000 | 100 | 25 |
| B plus VII | 0.300; 0.10 | To 765 | 6,920 | 80 | 32 |
| C plus IX | 0.100; 0.30 | To 730 | 7,950 | 89 | 50 |
| III plus B | 0.300; 0.10 | To 730 | 7,590 | 32 | 50 |
| Z* | 0.30 | To 645 | 2,000 | 3 | <1 |

* Anhydro-3-ethyl-9-methyl-3'-(3-sulfobutyl)thiacarbocyanine hydroxide.

Referring to above Table 3, it will be noted that the dye combinations of the invention provide emulsions and photographic elements therewith that are characterized by markedly increased speed and spectral sensitization over substantially the entire region of the spectrum ranging about from 300 to 750 nm. It will be noted further that none of the dyes individually show this over-all improvement. Also, the comparison Dye Z shows relative speeds of only 2000, 3 and <1 for the blue, the 633 nm. and the 694 nm. regions, respectively.

The following examples further illustrate the preparation of a number of especially useful complex merocyanine dyes of the invention.

EXAMPLE A

2[(2-diphenyl amino - 4 - oxo - 2 - thiazolin-5-ylidene) ethylidene] - 3 - ethyl - 5 - [(1,3,3-trimethyl-2-indolinylidene)ethylidene] - 1 - phenyl - 4 - imidazolidinone (Dye I herein)

2-(2-anilinovinyl) - 3 - ethyl - 4 - oxo-1-phenyl-5-[(1,3,3-trimethyl - 2 - indolinylidene)ethylidene]-2-imidazolinium iodide (1 mol., 2.50 g.), 2-diphenylamino-2-thiazolin-4-one (1 mol. +45%, 1.60 g.), acetic anhydride (1 mol. +140%, 1.00 g.) and triethylamine (1 mol. +160%, 1.50 g.) are dissolved in pyridine (15 ml.) and the solution is heated under reflux for 5 minutes. The reaction mixture is cooled and diluted with water (150 ml.). After chilling overnight the water layer is decanted. The residual oil is washed with water and dried in a vacuum oven. The crude product is boiled with methanol. The mixture is chilled overnight, and the crude oil is collected by filtration, washed with methanol and dried. After two recrystallizations from pyridine and methanol, the pure dye has a M.P. 247–248° C., decomposes.

EXAMPLE B

2-[(1-carboxymethyl - 4 - oxo - 3 - phenyl-2-thioxo-5-imidazolidenylidene)-ethylidene] - 3 - ethyl - 1 - phenyl-5-[(1,3,3-trimethyl - 2 - indolinylidene)ethylidene]-4-imidazolidinone (Dye II herein)

2-(2-anilinovinyl) - 3 - ethyl - 4 - oxo-1-phenyl-5-[(1,3,3-trimethyl -2 - indolinylidene)ethylidene] - 2 - imidazolinium iodide (1 mol., 5.30 g.), 1-carboxymethyl-3-phenyl-2-thiohydantoin (1 mol. +280%, 7.40 g.), acetic anhydride (1 mol. +240%, 3.00 g.) and triethylamine (1 mol. +250%, 4.00 g.) are dissolved in pyridine (25 ml.), and the solution is heated under reflux for five minutes. The reaction mixture is cooled and diluted with water (150 ml.). After chilling the dye suspension, the crude dye is collected by filtration, washed with water and dried in a vacuum oven. The crude product is boiled with methanol (50 ml.). The resulting mixture is chilled and the dye is collected by filtration, washed with methanol and dried. After recrystallization of one-half of this sample three times from pyridine and methanol, the pure dye obtained has a M.P. of 259–261° C.

EXAMPLE C

2-[(3-methyl - 5 - oxo - 1 - phenyl-2-pyrazolin-4-ylidene) ethylidene] - 1 - phenyl - 5 - [(1,3,3-trimethyl-2-indolinylidene)ethylidene] - 4 - imidazolidinone (Dye VIII herein)

2-methyl - 4 - oxo - 1 - phenyl-5-[(1,3,3-trimethyl-2-indolinylidene)ethylidene] - 2 - imidazolinium hydroiodide, (1 mol., 1.20 g.), 4-anilinomethylene-3-methyl-1-phenyl-2-pyrazolin-5-one (1 mol., 0.70 g.), acetic anhydride (1 mol. +100%, 0.50 g.) and triethylamine (1 mol. +100%, 0.75 g.) are dissolved in pyridine (10 ml.), and the solution is heated under reflux for twenty minutes. The hot reaction mixture is treated first with acetic anhydride (5 ml.) and then with N,N-diethylethylenediamine (5 ml.). The resulting mixture is diluted with methanol (125 ml.). After chilling the solution overnight, the crude dye is collected by filtration, washed with methanol and dried. After two recrystallizations from N,N-dimethylformamide and methanol, the pure dye has a M.P. of 237–238.5° decomposes.

EXAMPLE D 3-ethyl - 5 - [(3 - ethyl-2-benzothiazolidinylidene)isopropylidene] - 2 - [(3 - ethyl - 4 - oxo-2-thioxo-5-thiazolidinylidene)ethylidene] - 1 - phenyl - 4 - imidazolidinone (Dye VII herein)

3-ethyl - 5 - [(3 - ethylbenzothiazolidinylidene)isopropylidene] - 2 - methyl - 4 - oxo-1-phenyl-2-imidazoinium iodide (1 mol., 1.36 g.), 5-acetanilidomethylene-3-ethylrhodanine (1 mol., 0.80 g.), acetic anhydride (200% excess, 0.50 g.) and triethylamine (1 mol. +200%, 0.75 g.) are dissolved in pyridine (10 ml.) and the solution is heated under reflux for twenty minutes. The hot reaction mixture is transferred to a beaker containing acetic anhydride (2.0 ml.). The warm solution is treated first with N,N-diethylethylenediamine (2.0 ml.) and then diluted with methanol (125 ml.). The solution is chilled overnight and the crude dye is collected by filtration, washed with methanol and dried. The crude dye is recrystallized by dissolving in hot pyridine containing acetic anhydride. The resulting solution is first treated with N,N-diethylethylenediamine and then diluted with methanol. The solution is chilled and the dye is collected by filtration, washed with methanol and dried. After a final recrystallization from pyridine and methanol, the pure dye has a M.P. of 313.5–314.5° C., decomposes.

Fine grain photographic silver halide emulsions such as those listed above, containing the supersensitizing dye combinations of the invention can also contain such addenda as chemical sensitizers, e.g., sulfur sensitizers (e.g., allyl thiocarbamate, thiourea, allylisothiocyanate, cystine, etc.), various gold compounds (e.g., potassium chloroaurate, auric trichloride, etc. (see Baldsiefen, U.S. Pat. No. 2,540,085, issued Feb. 6, 1951; Damschroder, U.S. Pat. No. 2,597,856, issued May 27, 1952 and Yutzy et al. U.S. Pat. No. 2,597,915, issued May 27, 1952), various palladium compounds such as palladium chloride (Baldsiefen, U.S. Pat. No. 2,540,086, issued Feb. 6, 1951), potassium chloropalladate (Stauffer et al., U.S. Pat. No. 2,598,079, issued May 27, 1952), etc., or mixtures of such sensitizers, antifoggants such as ammonium chloroplatinate (Trivelli et al. U.S. Pat. No. 2,566,245, issued Aug. 28, 1951), ammonium chloroplatinite (Trivelli et al., U.S. Pat. No. 2,566,263, issued Aug. 28, 1951), benzotriazole, nitrobenzimidazole, 5-nitroimidazole, benzidine, mercaptans, etc. (see Mees—"The Theory of the Photographic Process," MacMillan Pub., 1942, page 460), or mixtures thereof. The fine grain photographic silver halide emulsions containing the supersensitizing combinations of the invention can be hardened with any suitable hardener, including aldehyde hardeners such as formaldehyde, and mucochloric acid, aziridine, hardeners, hardeners which are derivatives of dioxane, oxy polysaccharides such as oxy starch or oxy plant gums, and the like. The emulsion layers can also contain additional additives, particularly those known to be beneficial in photographic emulsions, including, for example, lubricating materials, stabilizers, speed increasing materials, absorbing dyes, plasticizers, and the like. These photographic emulsions can also contain in some cases additional spectral sensitizing dyes. Furthermore, these emulsions can contain color forming couplers or can be developed in solutions containing couplers or other color generating materials. Among the useful color formers are the monomeric and polymeric color formers, e.g., pyrazolone color formers, as well as phenolic, heterocyclic and open chain couplers having a reactive methylene group.

The color forming couplers can be incorporated into the direct positive photographic silver halide emulsion using any suitable technique, e.g., techniques of the type shown in Jelley et al. U.S. Pat. 2,322,027, issued June 15, 1943, Fierke et al. U.S. Pat. 2,801,171, issued July 30, 1957, Fisher U.S. Pats. 1,055,155 and 1,102,028, issued Mar. 4, 1913 and June 30, 1914, respectively, and Wilmanns U.S. Pat. 2,186,849 issued Jan. 9, 1940. They can also be developed using incorporated developers such as polyhydroxybenzenes, aminophenols, 3-pyrazolidones, and the like.

Although the invention has been described in considerable detail with particular reference to certain preferred embodiments thereof, it will be understood that variations and modifications can be effected within the spirit and scope of the invention as described hereinabove, and as defined in the appended claims.

We claim:

1. A fine grain photographic silver halide emulsion wherein said silver halide has an average grain size less than .5 micron, containing a supersensitizing dye combination comprising (1) a quaternated ocmplex cyanine dye having three 5- to 6-membered nitrogen containing heterocyclic nuclei joined at ring carbon atoms thereof by methine linkage, both terminal nuclei being basic N-heterocyclic nuclei of the type used in cyanine dyes, and the central nucleus being an acidic keto heterocyclic nucleus of the type used in merocyanine dyes, said dye having the amidinium ion system; and (2) a complex merocyanine dye having three 5- to 6-membered nitrogen containing heterocyclic nuclei joined at ring carbon atoms thereof by a linkage selected from the group consisting of a double bond linkage and a methine linkage, one terminal nucleus being a basic N-hetereocyclic nucleus of the type used in cyanine dyes, and each of the other two nuclei being acidic keto heterocyclic nucei of the type used in merocyanine dyes, said dye having the amidic system.

2. A fine grain emulsion in accordance with claim 1 wherein said silver halide has an average grain size of about from .04 to .40 micron.

3. A fine grain emulsion in accordance with claim 1 containing a color former.

4. A fine grain emulsion in accordance with claim 1 wherein the dye proportions range from 10 to 90% by weight of (1) and conversely from 90 to 10% by weight of (2).

5. A fine grain emulsion in accordance with claim 1 wherein said emulsion is a silver bromoiodide emulsion.

6. A fine grain photographic silver halide emulsion, wherein silver halide grains have an average grain size less than .5 micron, containing a supersensitizing dye combination of (1) a complex cyanine dye having the following general formula:

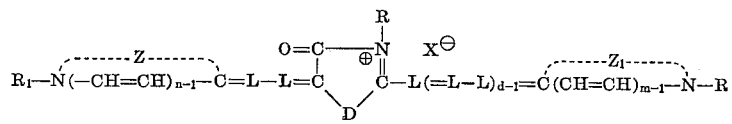

and (2) a complex merocyanine dye having the following general formula:

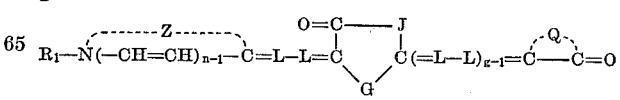

wherein n, m, d and g each represent a positive integer of from 1 to 2; L represents a methine linkage; J and G each represent a member selected from the group consisting of oxygen, sulfur, selenium and the group =N—R such that at least one of J and G represent said =N—R group; D represents a member selected from the group consisting of oxygen, sulfur, selenium and the group =N—R; R represents a member selected from the group consisting of an alkyl group, a cycloalkyl group and an aryl group; $R_1$ and $R_2$ each represents a member selected from the group consisting of an alkyl group, an alkenyl group and an aryl group; X represents an acid anion; Z and $Z_1$ each represent the non-metallic atoms necessary to complete a heterocyclic nucleus containing 5 to 6 atoms in the heterocyclic ring of the type used in cyanine dyes; and Q represents the non-metallic atoms necessary to complete a heterocyclic nucleus of the type used in merocyanine dyes containing from 5 to 6 atoms in the heterocyclic ring, 3 to 4 of said atoms being carbon atoms, one of said atoms being a nitrogen atom, and one of said atoms being selected from the group consisting of nitrogen, oxygen, sulfur, and selenium.

7. A fine grain emulsion in accordance with claim 6 wherein said silver halide has an average grain size of about from .04 to .4 micron.

8. A fine grain emulsion in accordance with claim 6 containing a color former.

9. A fine grain emulsion in accordance with claim 6 wherein the dye proportions range from 10 to 90% by weight of (1) and conversely from 90 to 10% of (2).

10. A fine grain emulsion in accordance with claim 6 wherein said emulsion is a silver bromoiodide emulsion.

11. A fine grain emulsion in accordance with claim 6 wherein said Z and $Z_1$ each represent the non-metallic atoms necessary to complete a heterocyclic nucleus selected from the group consisting of a thiazole nucleus, an oxazole nucleus, a selenazole nucleus, a 3,3-dialkylindolenine nucleus and an imidazole nucleus.

12. A fine grain emulsion in accordance with claim 6 wherein said Q represents the non-metallic atoms necessary to complete a 2-thiazolin-4-one nucleus, a 2-thioxo-4-imidazolidone nucleus, a 2-pyrazolin-5-one nucleus, a 2-thioxo-4,6-pyrimidinedione nucleus and a 2-thioxo-4-thiazolidinone nucleus.

13. A fine grain photographic silver halide emulsion, wherein said silver halide grains have an average grain size less than .5 micron, containing a supersensitizing dye combination comprising (1) the complex cyanine dye 3-ethyl-5-[(3-methyl-2-thiazolidinylidene)ethylidene] - 2-[(3-methyl-2-thiazolidinylidene)-1-propenyl] - 4-oxo-1-phenyl-2-imidazolinium salt and (2) the complex merocyanine dye 2-[(2-diphenylamino-4-oxo-2-thiazolin-5-ylidene)ethylidene] - 3-ethyl-1-phenyl-5-[(1,3,3-trimethyl-2-indolinylidene)ethylidene]-4-imidazolidinone.

14. A fine grain emulsion in accordance with claim 13 wherein said silver halide has an average grain size of about from .04 to .4 micron.

15. A fine grain emulsion in accordance with claim 13 wherein said silver halide emulsion is a silver bromoiodide emulsion.

16. A fine grain photographic silver halide emulsion, wherein said silver halide grains have an average grain size less than .5 micron, containing a supersensitizing dye combination comprising the complex merocyanine dye 2-[(1-carboxymethyl - 4-oxo-3-phenyl-2-thioxo-5-imidazolideneylidene)ethylidene]-3 - ethyl-1-phenyl-5-[(1,3,3-trimethyl-2 - indolinylidene)ethylidene]-4 - imidazolidinone.

17. A fine grain emulsion in accordance with claim 16 wherein said silver halide has an average grain size of about from .04 to .4 micron.

18. A fine grain emulsion in accordance with claim 16 wherein said silver halide emulsion is a silver bromoiodide emulsion.

19. A fine grain photographic silver halide emulsion, wherein said silver halide grains have an average grain size less than .5 micron, containing a supersensitizing dye combination comprising (1) the complex cyanine dye 2-[(2-benzothiazolyl etho-p-toluenesulfonate)methylene]-5-[(1,3-diethyl-2-(3H) - benzimidazolylidene)ethylidene]-3-ethyl-4-thiazolidone and (2) the complex merocyanine dye 2-{[(2-benzothiazolyl)-3-methyl-5-oxo-2-pyrazolin-4-ylidene]ethylidene}-3-ethyl-5-[(3-ethyl-2 - benzoxazolinylidene)ethylidene]-1-phenyl-4-imidazolidinone.

20. A fine grain emulsion in accordance with claim 19 wherein said silver halide has an average grain size of about from .04 to .4 micron.

21. A fine grain emulsion in accordance with claim 19 wherein said silver halide emulsion is a silver bromoiodide emulsion.

22. A fine grain photographic silver halide emulsion wherein said silver halide grains have an average grain size less than .5 micron, containing a supersensitizing dye combination comprising (1) the complex cyanine dye 2-[(2 - benzothiazolyl etho-p-toluenesulfonate)methylene]-5-[(1,3 - diethyl-2-(3H)-benzimidazolylidene)ethylidene]-3-ethyl-4-thiazolidone and (2) the complex merocyanine dye 3-ethyl-5-[(3 - ethyl-2-benzothiazolinylidene) isopropylidene]-2-[(3-ethyl - 4 - oxo-2-thioxo-5-thiazolidinylidene)ethylidene]-1-phenyl-4-imidazolidinone.

23. A fine grain emulsion in accordance with claim 22 wherein said silver halide has an average grain size of about from .04 to .4 micron.

24. A fine grain emulsion in accordance with claim 22 wherein said silver halide emulsion is a silver bromoiodide emulsion.

25. A fine grain photographic silver halide emulsion wherein said silver halide grains have an average grain size less than .5 micron, containing a supersensitizing dye combination comprising (1) the complex cyanine dye 1-ethyl-4-[(3 - ethyl-2(3H)-benzoxazolylidene)ethylidene]-2-[3-ethyl - 2(3H) - benzoxazolylidene)-1-propenyl]-5-oxo-3-phenyl-2-imidazolinium iodide and (2) the complex merocyanine dye 3-(3-diethylaminopropyl)-2-[3-dimethylaminopropyl) - 4 - oxo-2-thioxo-5-thiazolidinylidene] - 5 - [(1-ethylnaphtho[1,2-d]thiazolin-2-ylidene)-1-phenylethylidene]-4-thiazolidinone.

26. A fine grain emulsion in accordance with claim 25 wherein said silver halide has an average grain size of about from .04 to .4 micron.

27. A fine grain emulsion in accordance with claim 25 wherein said silver halide emulsion is a silver bromoiodide emulsion.

28. A photographic element comprising a support coated with at least one layer of a fine grain photographic silver halide emulsion of claim 1.

29. A photographic element comprising a support coated with at least one layer of a fine grain photographic silver halide emulsion of claim 6.

30. A photographic element comprising a support coated with at least one layer of a fine grain silver halide emulsion of claim 13.

31. A photographic element comprising a support coated with at least one layer of a fine grain photographic silver halide emulsion of claim 16.

32. A photographic element comprising a support coated with at least one layer of a fine grain photographic silver halide emulsion of claim 19.

33. A photographic element comprising a support coated with at least one layer of a fine grain photographic silver halide emulsion of claim 22.

34. A photographic element comprising a support coated with at least one layer of a fine grain silver halide emulsion of claim 25.

References Cited

UNITED STATES PATENTS 2,454,629  11/1948  Brooker _____ 260—240

FOREIGN PATENTS 507,199  11/1954  Canada _____ 96—104
511,770  4/1955  Canada _____ 96—104

NORMAN G. TORCHIN, Primary Examiner

E. C. KIMLIN, Assistant Examiner

U.S. Cl. X.R.

96—106

PO-1050
(5/69)

UNITED STATES PATENT OFFICE
CERTIFICATE OF CORRECTION

Patent No. 3,565,630          Dated February 23, 1971

Inventor(s) Allan G. Millikan and Gary L. Hiller

It is certified that error appears in the above-identified patent and that said Letters Patent are hereby corrected as shown below:

Column 16, line 52, after "wherein", insert --said--.

Column 16, line 60, that part of formula reading =C(CH= should read =C(-CH=.

Column 16, line 60, that part of formula reading N-R should read $N-R_2$.

Signed and sealed this 21st day of September 1971.

(SEAL)
Attest:

EDWARD M. FLETCHER, JR.
Attesting Officer

ROBERT GOTTSCHALK
Acting Commissioner of Pa